Figure 1:
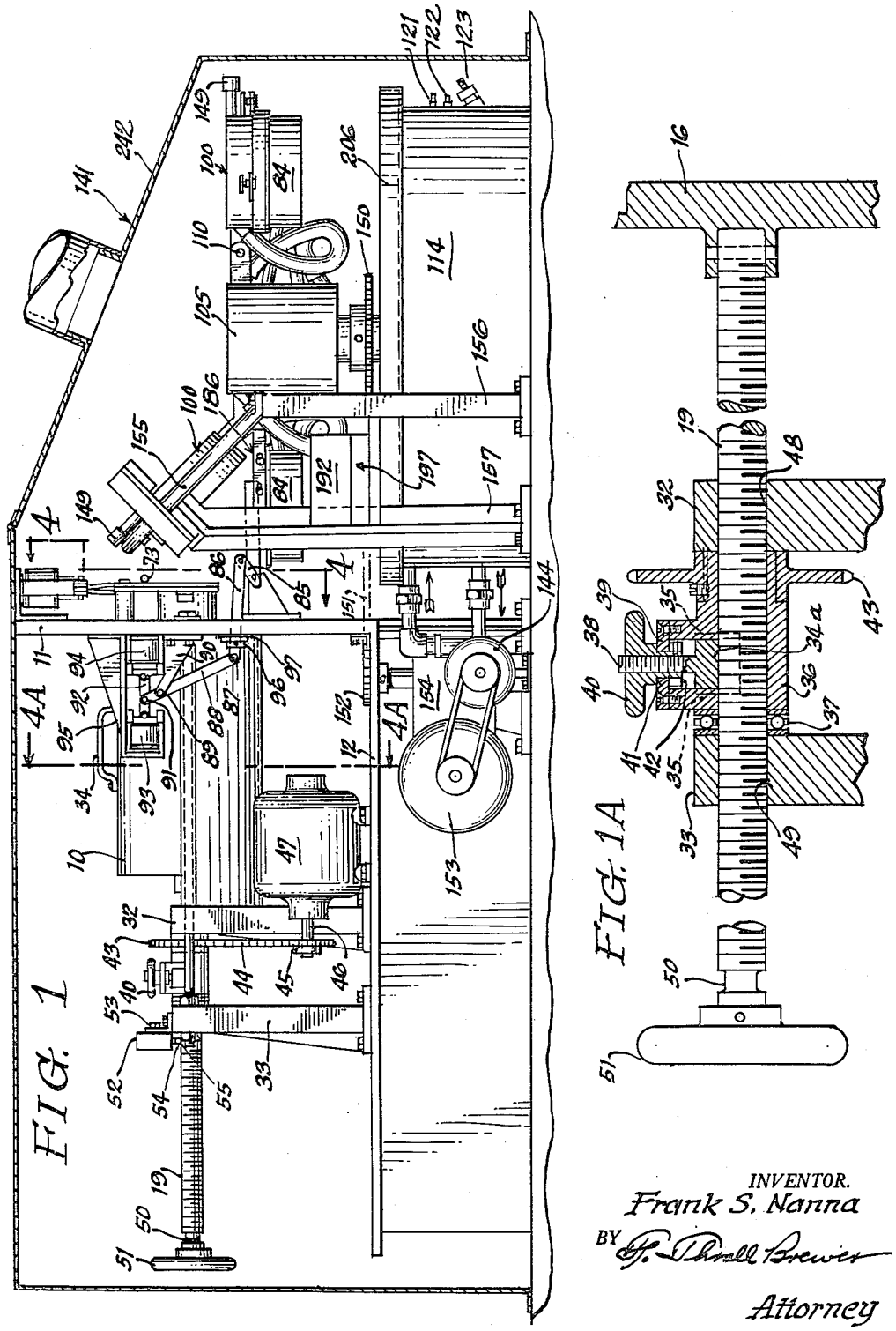

Nov. 20, 1962  F. S. NANNA  3,064,555
MACHINE FOR AUTOMATICALLY FORMING AND BROILING HAMBURGERS
Filed Aug. 2, 1955  7 Sheets-Sheet 2

INVENTOR.
*Frank S. Nanna*
BY
*Attorney*

Nov. 20, 1962   F. S. NANNA   3,064,555
MACHINE FOR AUTOMATICALLY FORMING AND BROILING HAMBURGERS
Filed Aug. 2, 1955   7 Sheets-Sheet 3

INVENTOR.
Frank S. Nanna
BY
H. Thrall Brewer
Attorney

Nov. 20, 1962 F. S. NANNA 3,064,555
MACHINE FOR AUTOMATICALLY FORMING AND BROILING HAMBURGERS
Filed Aug. 2, 1955 7 Sheets-Sheet 4

INVENTOR.
Frank S. Nanna
BY
Attorney

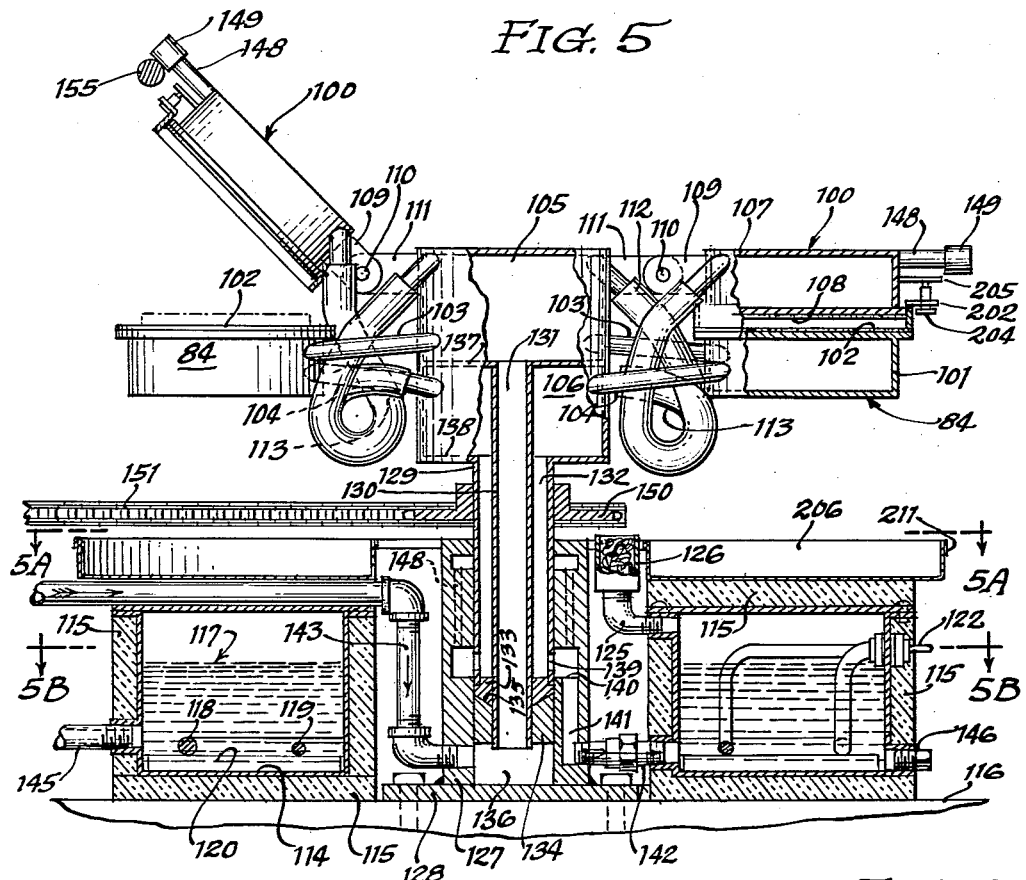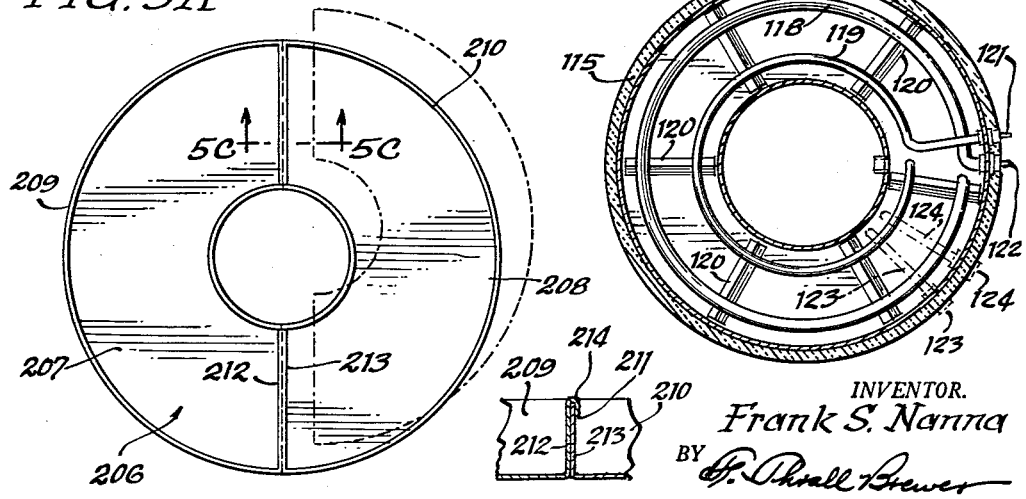

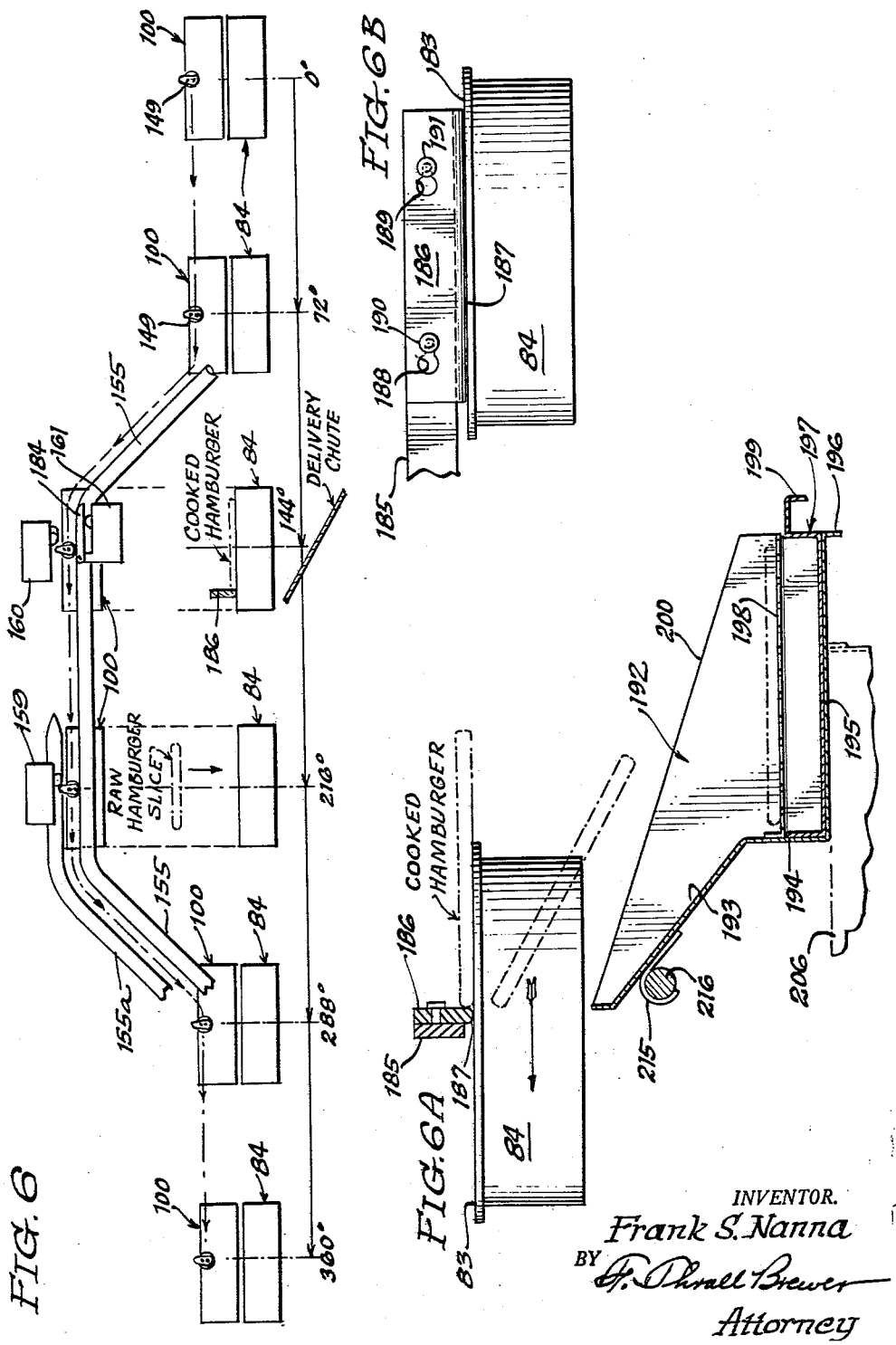

Nov. 20, 1962  F. S. NANNA  3,064,555
MACHINE FOR AUTOMATICALLY FORMING AND BROILING HAMBURGERS
Filed Aug. 2, 1955  7 Sheets-Sheet 7
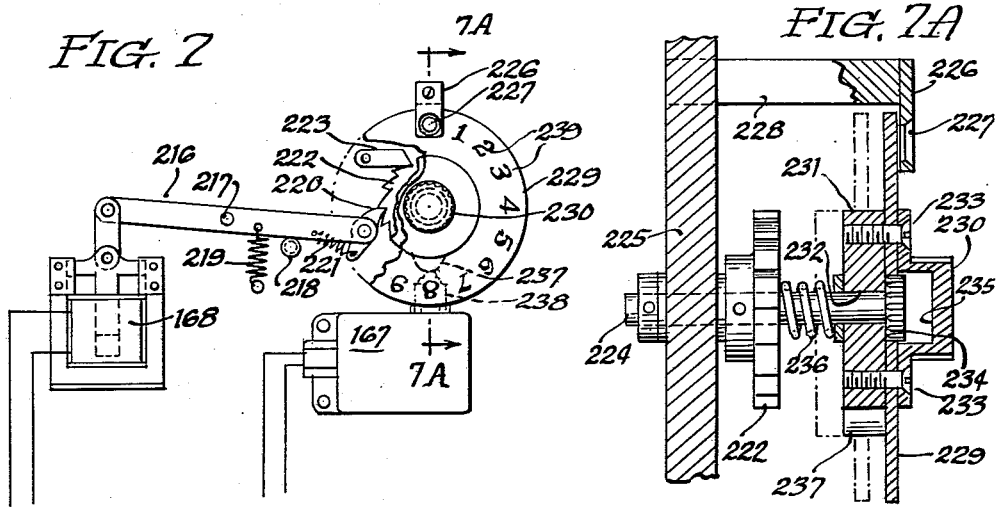
FIG. 7
FIG. 7A
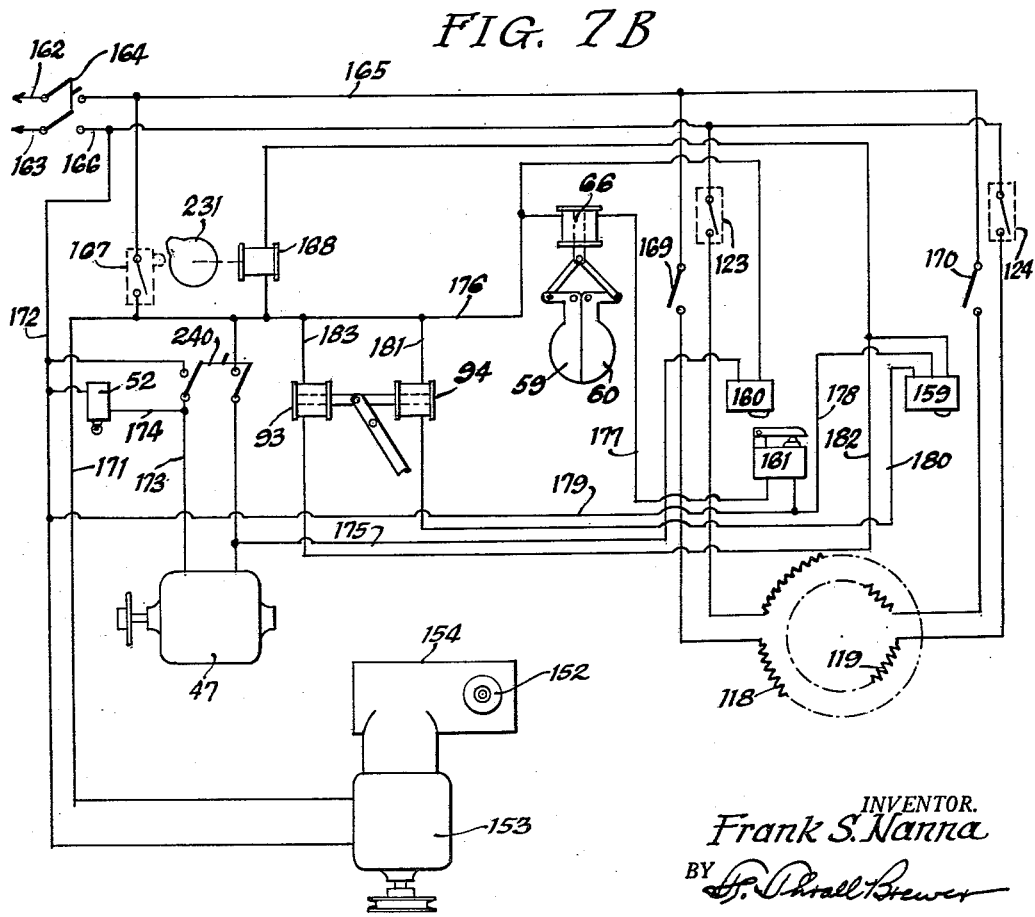
FIG. 7B
INVENTOR.
Frank S. Nanna
BY
Attorney

United States Patent Office 3,064,555
Patented Nov. 20, 1962

3,064,555
MACHINE FOR AUTOMATICALLY FORMING
AND BROILING HAMBURGERS
Frank S. Nanna, 1735 26th St., San Pedro, Calif.
Filed Aug. 2, 1955, Ser. No. 525,960
4 Claims. (Cl. 99—353)

This invention relates to a machine for automatically forming and broiling food in a plastic state such as ground meat for hamburgers.

One of the objects of this invention is the provision of a machine which will operate upon a quantity of ground meat disposed in a container attached to the machine to form disc-like patties therefrom, transfer the patties to a hot grill, broil both sides of the patty simultaneously, and remove the broiled patty from the grill, all without the intervention or assistance of an operator as long as there is a supply of meat in the container.

Another object of this invention is the provision of a machine for automatically and continuously making a broiled hamburger from a quantity of raw ground meat, said machine being readily cleaned and in all respects producing food which satisfies State and Federal pure food laws and regulations.

A further object of this invention is the provision of a plurality of pairs of upper and lower grills for cooking food such as ground meat or the like therebetween, all of said grills being heated to identical temperatures and all portions of the cooking surfaces of all of the grills being at substantially the same temperature to insure absolute uniformity in the cooked food.

A feature of this invention is an extruding apparatus for extruding quantities of ground meat from a container with means for automatically slicing predetermined portions of the extruded meat into a mechanism for transferring the sliced portion to a heated grill.

Another feature of this invention is the provision of separable upper and lower grills for broiling both sides of a hamburger patty, with removable sealing rings adapted to seal the peripheral regions of the grills, thereby to provide a means for confining the hamburger and the moisture and juices emanating therefrom during the cooking process to a small space surrounding the hamburger and thus to improve its taste.

As a specific object this invention has within its purview the provision of electrically operated means for performing the operations required to produce automatically a finished hamburger from a quantity of raw meat, and controls for automatically effecting such operation.

It is also an object of this invention to provide a control means for an automatic hamburger making machine which may be preset to cause the machine to make a predetermined number of hamburgers automatically and then stop.

Among the more general objects of this invention are the provision of an automatic hamburger making machine which is constructed so as to require little maintenance, is simple to use, which can be substantially completely enclosed and which may be readily taken apart for effective sanitary cleansing.

Figure 2:
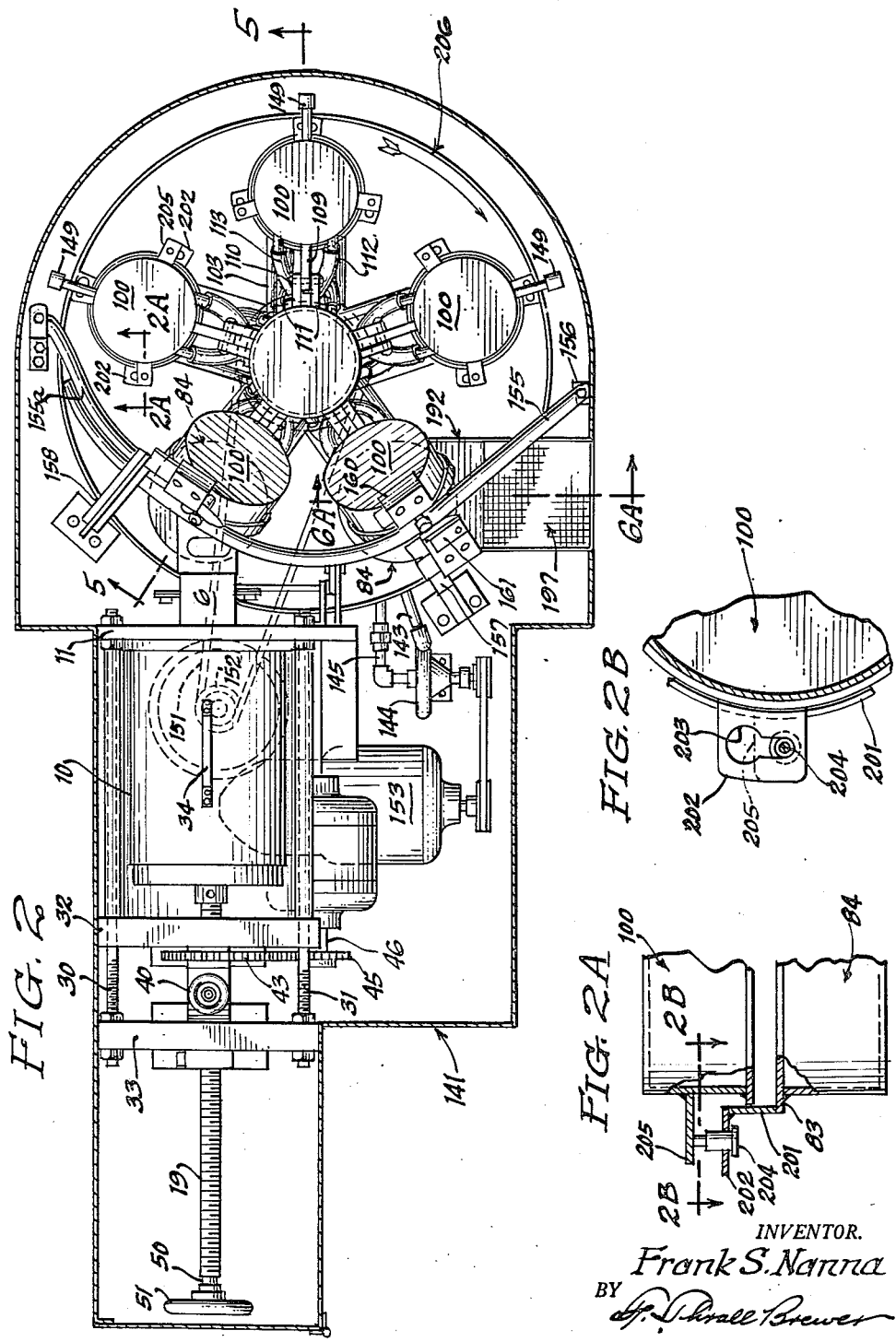
Figures 3, 3A:
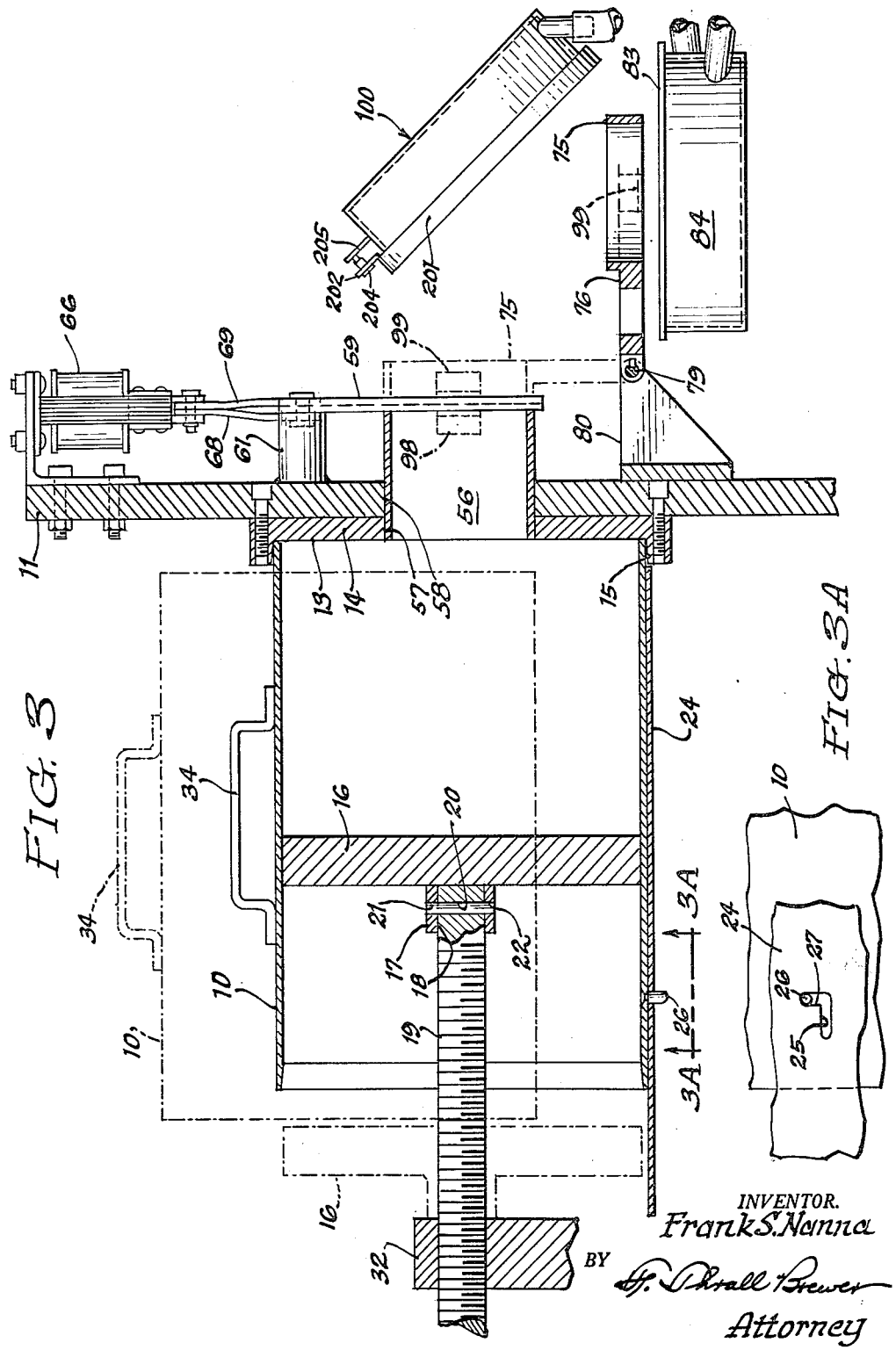
Figure 4:
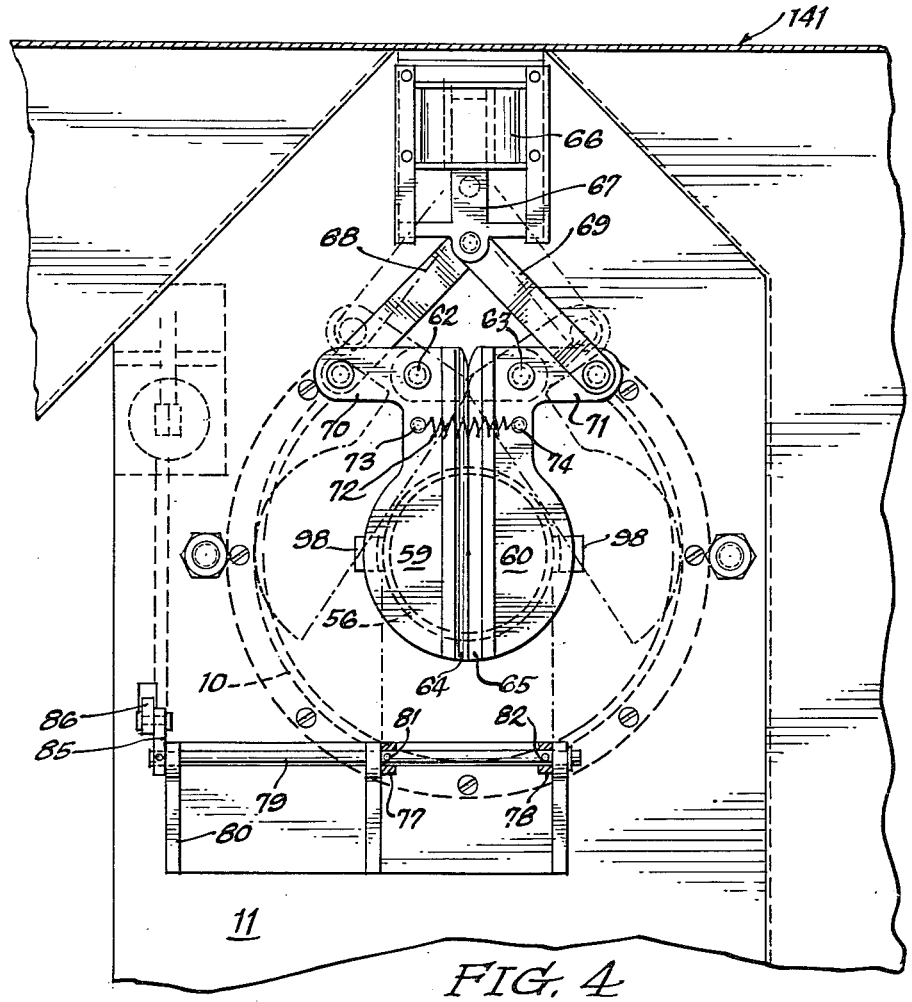
Figure 4A:
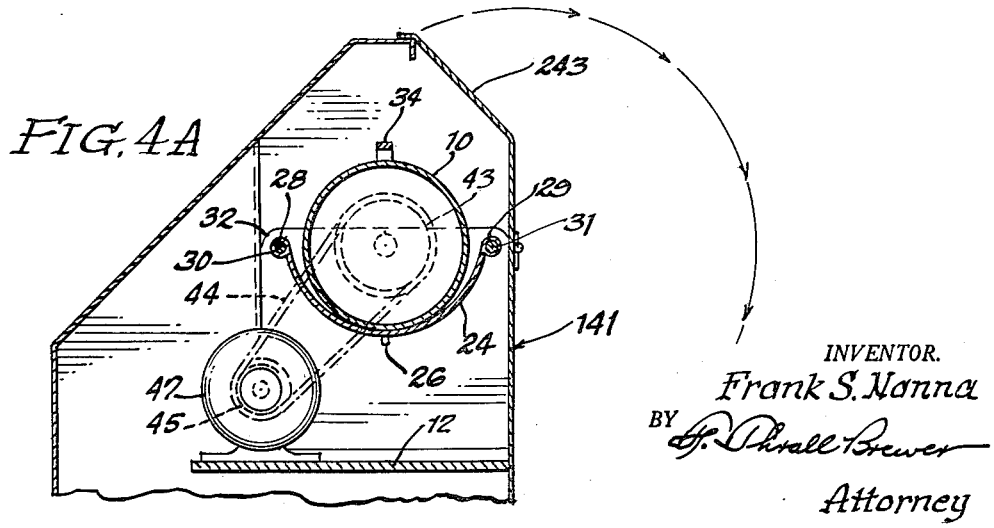

These and other objects and features of this invention will become apparent from the following detailed description when taken together with the accompanying drawings in which, FIG. 1 is a side elevational view of a machine incorporating this invention, the machine being shown with a portion of its cover removed;

FIG. 1-A is a greatly enlarged side elevation in section, of that portion of the machine comprising the means for operating the extruder of the machine;

FIG. 2 is a plan view of the machine of FIG. 1 likewise shown with a portion of its cover removed;

FIG. 2-A is an enlarged fragmentary side elevation, partly in section, showing the support for the sealing ring for the grills of the machine of FIG. 1;

FIG. 2-B is a corresponding fragmentary plan view, partly in section, of the sealing means of FIG. 2-A, the view being taken substantially along the line 2B—2B of FIG. 2-A;

FIG. 3 is a greatly enlarged side elevational view, in section, of that portion of the machine which includes the meat container of the extruder, the knives for cutting off a section of the extruded meat, and the means for transferring the extruded and severed portion of meat to a heated grill;

FIG. 3-A is a fragmentary bottom view of the means for locking the meat container of the extruder in place in the machine;

FIG. 4 is an enlarged front elevational view of a fragment of the machine, the view being taken along the line 4—4 of FIG. 1;

FIG. 4-A is a section taken through the meat containing portion of the extruder, the view being taken along line 4A—4A of FIG. 1;

FIG. 5 is an enlarged side elevational view in section of the grill portion of the machine taken along line 5—5 of FIG. 2;

FIG. 5-A is a plan view, reduced in size and taken along line 5A—5A of FIG. 5, of the drip pan used with the grill portion of the machine;

FIG. 5-B is a plan view in section, of the heater portion of the machine, the view being taken along line 5B—5B of FIG. 5 and being reduced in size with respect to that figure;

FIG. 5-C is a fragmentary elevation in section taken along line 5C—5C of FIG. 5-A;

FIG. 6 is a development of the grill section showing it in various stages of operation, the showing being schematic for purposes of illustration;

FIG. 6-A is an enlarged fragmentary elevational view in section taken along line 6A—6A of FIG. 2 showing the means for removing and storing a finished hamburger;

FIG. 6-B is an elevation of the scraper used with the apparatus of FIG. 6-A;

FIG. 7 is a fragmentary elevational view of the control mechanism for stopping the machine after a predetermined number of hamburgers has been made;

FIG. 7-A is a greatly enlarged side elevational view, in section, of the fragment of the control mechanism of FIG. 7; and FIG. 7-B is a schematic wiring diagram for the electrically operated mechanisms used in the machine and their control switches.

In the embodiment chosen to illustrate this invention the machine is comprised of a plurality of pairs of opposed grills between which the meat or the like is confined and broiled. The grills are arranged radially about, and to revolve with, a revolving shaft, and as they rotate, the upper grill contacts a rail which lifts it off the meat to enable a scraper mechanism to remove the cooked meat from the grill and to allow a transfer mechanism to transfer a formed patty of uncooked meat from an extruder to the surface of the lower grill. The upper grill is then lowered upon the meat and the grills then revolve slowly while cooking the meat until the rail is again contacted by the upper grill.

The grills are constructed in the form of closed containers through which is circulated hot oil maintained at the proper temperature for broiling the hamburgers by thermostats associated with the electric heating units used to heat the oil.

The extruder is of the piston type, the piston being adapted to enter the open end of a cylindrical container in which the uncooked meat is stored. The piston is advanced into the container by a screw driven intermittently by an electric motor. The container is readily removable from the machine for refilling whenever necessary. The meat is extruded through an opening of smaller diameter into a tube, the end of which may be closed by a pair of scissor-like knives, and the severed patty is retained in a ring normally located at the end of the tube beyond the knives, the ring being hinged to transfer the patty from the tube to the surface of an empty lower grill.

All of the operations of the machine are effected either by electric solenoids or by electric motors, the functioning of both of which is timed by a plurality of switches operated by the grills themselves as they revolve with the central shaft.

Referring now to the drawings for a detailed description of the invention and particularly to FIGS. 1 and 2, the raw meat is placed in a cylindrical, open-ended container 10 disposed with its axis in a horizontal position adjacent a vertical wall 11 securely fastened to a platform 12. As shown more clearly in FIG. 3, the right hand end of container 10 is inserted into a recess 13 formed in a plate 14 secured to vertical wall 11. The tapered sides 15 of recess 13 are so proportioned relative to the outside diameter of container 10 that when it is inserted into the recess, a seal is effected between the container and plate 14.

The open left hand end of container 10 as viewed in FIGS. 1 and 3 is engaged by a piston 16 axially reciprocable therein and provided with a boss 17 in which is formed a recess 18 for the reception of the right hand end, as viewed in FIGS. 1 and 3, of the feed screw 19 of the extruding mechanism. Said screw has a diametrically disposed opening 20 therein adapted to be aligned with openings 21, 22 in the sides of boss 17 to permit the insertion of a pin 23 which locks that end of the feed screw 19 in piston 16, and also prevents the feed screw from turning relative to the piston.

Container 10 is located with respect to recess 13, and supported in the machine, by a sheet metal cradle 24 which, as shown more clearly in FIGS. 3-A and 4-A, is provided with an L-shaped slot 25 for the reception of a pin 26 extending radially outwardly from the bottom of container 10. The circumferential leg 27 of slot 25 serves to hold the container 10 firmly against the bottom of recess 13, and also serves to enable the container to resist backward axial movement in response to pressures in that direction which may be developed therein by piston 16. Since pin 26 must move circumferentially in leg 27 to reach its axial locking position, a slight rotation of the cylinder 10 must take place before pin 26 is seated in the end of leg 27. This slight rotation assists in seating the end of container 10 in recess 13.

Cradle 24 is substantially semi-cylindrical in form, the radial dimension of the cradle, however, being somewhat larger than the radial dimension of container 10 to avoid the necessity of carefully and accurately aligning the filled container with the cradle when the filled container is inserted therein, the container at such times being quite heavy and therefore somewhat difficult to manipulate accurately without a support. The edge regions 28 and 29 of cradle 24 are curled around longitudinally extending rods 30 and 31, respectively, which are threaded at their extremities (FIG. 2) and pass through wall 11 at one end and through spaced vertically disposed brackets 32 and 33 at their other end. Said threaded ends of rods 30 and 31 are securely fastened to wall 11 and bracket 33 by a plurality of nuts disposed one on each side of said wall and bracket.

Container 10 is provided with a handle 34 secured thereto at a point diametrically opposed to the point at which pin 26 is secured thereto so that when the filled container is held by handle 34 in pendulous fashion over cradle 24, pin 26 will be in proximity to its slot 25 and it can therefore be readily made to enter said slot and thus properly to locate the cylinder with respect to recess 13.

Movement of piston 16 in container 10 is effected by a half nut 34a (FIG. 1-A) mounted in radially disposed spaced gibs 35 formed in a sleeve 36 supported by, and freely rotatable on, feed screw 19. Said sleeve 36 is disposed between brackets 32 and 33 with its right hand end abutting on, or adjacent to, bracket 32 as viewed in FIG. 1-A, and its left hand end abutting on a thrust bearing 37 inserted between sleeve 36 and bracket 33. Half nut 34 has a threaded stem 38 extending radially outwardly with respect to feed screw 19 and passing through a plate 39 secured over the end of gibs 35. An internally threaded hand wheel 40 is threaded over stem 38 and is prevented from moving radially with respect to feed screw 19 on one side by a shoulder 41 abutting on the outside of plate 39 and on the opposite side by a collar 42 affixed to a reduced portion of hand wheel which extends through plate 39. It may be apparent from the description thus far given that as hand wheel 40 is turned, pin 38 will move radially inwardly or outwardly with respect to feed screw 19, thereby moving half nut 34 with it. Thus half nut 34 may be made to engage feed screw 19 or to be disengaged therefrom as desired.

Sleeve 36 may be rotated by a sprocket 43 which is secured to sleeve 36 and is connected by a suitable chain 44 (FIG. 1) to a drive sprocket 45 secured to the shaft 46 of an electric motor 47. Said motor 47 rotates in such direction that when half nut 34 is engaged with feed screw 19, it will advance the feed screw 19 to the right as viewed in FIGS. 1 and 1-A, thereby forcing piston 16 into container 10 against the meat contained therein. When half nut 34 is disengaged from feed screw 19, obviously said feed screw may be moved freely back and forth in sleeve 36 and hence piston 16 may be withdrawn quickly manually from an empty container 10 to permit a rapid removal of the container and the replacement thereof with a filled container or with the same container after it has been refilled.

Feed screw 19 is rotatably supported in brackets 32 and 33 and passes through suitable openings 48 and 49 provided therein for this purpose. Said brackets 32 and 33 are fastened to platform 12 by any appropriate means as is also motor 47. The left hand end of feed screw 19 as viewed in FIGS. 1 and 1-A is formed with a peripheral groove 50 adjacent to which is secured a hand wheel 51 by which feed screw 19 may be turned manually if desired or pulled axially when piston 16 is to be withdrawn from cylinder 10.

The operation of motor 47 is controlled in part by a switch 52 mounted on a bracket 53 secured to the top of bracket 33 and provided with a radially movable switch arm 54 having a shoe 55 secured to the end thereof and adapted to ride on the exterior of feed screw 19. When the feed screw has been advanced to the right as viewed in FIGS. 1 and 1-A by motor 47 and half nut 34 to the extent that shoe 55 drops into groove 50, switch 52 will be operated to break the circuit to motor 47 thereby stopping said motor and preventing breakage of the machine by an over travel of piston 16 against plate 14.

The ground meat from container 10 is extruded into a tube 56 (FIG. 3) which is welded or otherwise secured in appropriate aligned openings 57 and 58 in plate 14 and vertical wall 11, respectively. The right hand end of tube 56 as viewed in FIG. 3 is normally closed by a pair of oscillatable knives (FIG. 4) 59 and 60 pivotally supported in a boss 61 extending to the right as viewed in FIG. 3 from the surface of wall 11. The pivoted supports 62 and 63 for knives 59 and 60, respectively, are disposed about horizontal axes located some distance above tube 56, and knives 59 and 60 swing in the same plane so that as they move across the open end of tube 56 toward one another their cutting edges 64 and 65 will traverse the open end and meet. Said cutting edges are straight and are disposed relative to pivoted supports 62 and 63 in such manner as to be parallel with one another at the point of contact therewith, and hence the entire open end of tube 56 will be swept by the knives and any meat extending beyond said open end will be severed from that in the tube.

The means for swinging knives 59 and 60 around their pivoted supports comprises a solenoid 66, the armature 67 of which is connected to a pair of divergent links 68 and 69. The opposite ends of the links are connected to arms 70 and 71, respectively, preferably formed integrally with knives 59 and 60 and extending horizontally in opposite directions from supports 62, 63. Thus, upward movement of armature 67 as viewed in FIG. 4 results in a pull on links 68 and 69 in upward direction which, in turn, causes knives 59 and 60 to swing about their pivots 62 and 63 away from one another to leave unobstructed the open end of tube 56 for the passage of meat therethrough. It is contemplated that knives 59 and 60 will be separated when solenoid 66 is energized and will be drawn together partly by gravity and partly by a spring 72 connected to pins 73 and 74 extending outwardly from knives 59 and 60, respectively. Spring 72 when installed is initially in tension and serves to pull and hold together knives 59 and 60 when solenoid 66 is deenergized. Thus, should solenoid 66 fail to function, or should the machine be shut down, the open end of tube 56 will nevertheless be closed.

The portion of the meat extruded into tube 56 and sliced off by knives 59 and 60 is disc-shaped and is automatically transferred to a grill for cooking. The transfer is effected by the mechanism shown in section in FIG. 3 and comprising a cylindrical ring or hoop 75, of the same internal diameter as tube 56, secured to a plate 76 having a pair of apertured ears 77, 78 (FIG. 4) through which passes a shaft 79 supported in a bracket 80 fastened to wall 11. Ears 77 and 78 are secured to shaft 79 by pins 81 and 82, respectively, to compel movement of the ears and associated plate 76 and ring 75 with shaft 79. Shaft 79 is so disposed relative to tube 56 that when ring 75 is swung upwardly to the position shown in dotted outline in FIG. 3 it will be in exact axial alignment with the axis of tube 56. It is contemplated that ring 75 in the said dotted position will contact the edge of tube 56 so as to leave no appreciable opening through which food may drop sideways out of the tube.

The consistency of the meat in container 10 is such that when ring 75 occupies the dotted position shown in FIG. 3 and the meat is extruded from tube 56 into said ring 75, it will substantially retain its shape and will frictionally bear against the interior surface of ring 75 so as to be held in the ring even after it is severed. The action of knives 59 and 60 in traversing the open end of tube 56 does not affect the position of the meat in the ring, but merely causes a sufficient separation between the ring and tube to permit the knife to pass therebetween.

The next step is to transfer the meat from ring 75 to the horizontal surface 83 of a grill 84. The means for transferring a severed meat patty from the interior of ring 75 to surface 83 is disclosed more clearly in FIGS. 1 and 4. In those figures a crank arm 85 is shown connected to one end of shaft 79 which extends beyond supporting bracket 80. The free end of said crank arm 85 is connected to a link 86 which passes through an appropriate opening in wall 11 and is connected to one end 87 of a lever 88 fulcrumed at 89 on a bracket 90 secured to the left hand side of wall 11 as viewed in FIG. 1. The end 91 of lever 88 opposite pivot 87 is pivotally connected to a horizontal bar 92, the opposite ends of which are connected to opposed solenoids 93 and 94, said solenoids in turn being mounted on a bracket 95 secured to wall 11. Thus, bar 92 may be reciprocated positively in either direction by the action of one or the other of the solenoids 93 and 94. This reciprocation results in an oscillation of lever 88 about fulcrum 89 and in the reciprocation of link 86 through its opening in wall 11. The reciprocation of link 86 results in an oscillation of crank arm 85 which is transmitted by shaft 79 to ears 77 and 78 through the pins 81 and 82 and thence through plate 76 to ring 75. Ring 75 may thus be oscillated between the solid and dotted positions thereof shown in FIG. 3 by the successive operation of solenoids 93 and 94.

Inasmuch as the meat is held frictionally in ring 75, the mere change in position of the ring from vertical to horizontal may not be sufficient to release the meat and cause it to drop upon surface 83. To effect a positive release therefor a flanged ring 96 is secured to link 86 on the left hand side of wall 11 as viewed in FIG. 1, and the region of wall 11 on that side thereof and surrounding the opening through which link 86 passes, is covered with a washer 97 made of rubber or similar preferably nonporous resilient material.

The position of ring 96 on link 86 is so chosen that the ring will strike the rubber washer 97 when ring 75 reaches the horizontal position shown in FIG. 3. The sudden stopping of ring 75 will jar the meat in said ring loose due to the momentum it possesses at that instant and hence the meat will consistently be made to leave ring 75 to drop upon the surface 83 as required.

It may be mentioned that inasmuch as knives 59 and 60 must pass between ring 75 and tube 56 when ring 75 contacts tube 56, and the exact point of contact between the two may be difficult to locate by the relatively freely swinging knives, both tube 56 and ring 75 are provided with guides between which the knives are retained when they are in their withdrawn position, and by which they are guided to the space between the ring and tube. The guides are so shaped as to provide converging surfaces which when cooperating with the moving knives serve to separate the ring 75 from the end of tube 56 to permit the knives to pass therebetween. These guides are shown in dotted outline in FIG. 3 at 98 and 99 and comprise lugs extending radially outwardly from the outer surfaces of tube 56 and ring 75 on either side of knives 59 and 60. It is understood that a pair of such guides 98 and 99 is provided for each knife.

The grills for cooking the meat, and the means for heating the grills, are shown in FIGS. 2 and 5. In these figures it may be seen that each grill is comprised of two parts, a lower grill 84 and an upper grill 100. Since all of the lower grills are identical and all the upper grills are identical, but one of each will be described herein in detail. Each lower grill 84 is comprised of a sealed container 101 having a meat contacting surface 102 preferably made of a material to which the meat does not readily adhere either in the cooked or uncooked state. Such material may be tetrafluoroethylene sold under the trade name of "Teflon" by E. I. du Pont de Nemours and disclosed and claimed in my copending application Serial No. 480,377, filed January 7, 1955, now abandoned. Access to container 101 is had by means of a pair of tubes 103 and 104 that are connected with superposed centrally disposed chambers 105 and 106 respectively. In addition to providing access to container 101, tubes 103 and 104 comprise rigid supports for the lower grill from containers 105 and 106. Thus the lower grills are disposed around containers 105 and 106 at equiangular intervals, the number of such grills being determined to a large extent by the intended capacity of the machine.

The upper grill 100 is comprised of a container 107 which may be identical in size and shape with container 101 but disposed in inverted relation thereto so that its cooking surface 108 is disposed on the bottom of the container and is adapted to contact the upper surface of the meat to be cooked. Container 107 is supported from container 105 by an arm 109 hingedly secured at 110 between spaced arms 111 extending from the sides of container 105 (see FIG. 2). This hinged construction allows container 107 to be raised with respect to container 101 in the manner shown to the left of FIG. 5. Communication to the interior of container 107 is established through a flexible hose 112 and communication between containers 107 and 106 is established through a flexible hose 113.

The heating medium for grills 84 and 100 is hot oil stored in an annular container 114 concentrically disposed with respect to containers 105 and 106. Said container 114 is covered on all sides by an adequate thickness of insulating material 115 to minimize the heat loss through the walls thereof, and the whole is supported from a counter 116 or other suitable base. The oil 117 in container 114 is heated by circular heating elements 118 and 119 (FIG. 5–B) supported in spaced relation with respect to the bottom of container 114 by a plurality of spoke-like, triangular cross-sectioned bars 120 of metal or other heat resistant material. Suitable external terminals 121 and 122 are provided for heating elements 119 and 118, respectively, by which said heating elements can be reached and connected to exterior controls. Two thermostats, 123 and 124, are inserted into container 114 at points remote from heating units 118 and 119 by which the operation of the heating units may be controlled. Thermostat 123 controls unit 118 and thermostat 124 controls unit 119. Appropriate individual switches are provided for each unit so that either or both units may be made operative. These switches will be described in detail hereinafter. Units 118 and 119 are of different capacities to provide different temperatures for the heating oil.

A vent pipe 125 terminating in an open chamber 126 filled with steel wool or the like serves as an outlet for vapors which may accumulate in container 114. It is understood, of course, that the interior of container 114 is at atmospheric pressure and that the total quantity of oil in the system never exceeds the total volumetric capacity of container 114, so that there is at no time any danger of the hot oil escaping through vent pipe 125 and open chamber 126. The steel wool functions as a filter to prevent entry of foreign matter into the oil. Due to the high temperature of the oil and the surrounding apparatus, steel wool has been found to be most satisfactory for this purpose since it can withstand relatively high temperatures without substantial deterioration.

In the open center of annular container 114 is disposed a vertical bearing 127 having a base flange 128 by which it is securely fastened to counter or base 116. Within bearing 127 are arranged concentrically an outer tube 129 and an inner tube 130 defining a central passage 131 and an annular concentric passage 132. A tapered plug 133 at the lower end of tube 129 serves to close off the annular passage 132 and serves also as a support for outer tube 129 and the parts secured thereto, including containers 105 and 106, the pairs of lower and upper grills 84 and 100, respectively, and the pivoted supports, pipes and tubes connected thereto. An inwardly directed thrust flange 134 is secured to the interior of bearing 127 and is provided with a tapered seat 135 upon which tapered plug 133 may bear. Inner tube 130 extends through thrust flange 134 and establishes communication from the interior of the tube to a space 136 defined at the lower end of bearing 127 by base flange 128 and the bottom surface of thrust flange 134.

Inner tube 130 extends upwardly into an opening in a partition 137 separating containers 105 and 106. Outer tube 129 terminates in an appropriate opening in the bottom wall 138 of container 106. A series of openings 139 in the lower part of outer tube 129 and aligned with an internal peripheral groove 140 in bearing 127 establish communication between annular space 132 and said groove 140, and a vertical passage 141 is connected by suitable pipes and couplings, designated generally by the reference character 142, to the lower interior regions of annular container 114. Suitable piping 143 connects space 136 with the outlet of a centrifugal pump 144 (FIGS. 1 and 2) driven by an electric motor 153, and piping 145 connects the interior of container 114 with the inlet of pump 144.

It may be apparent from the description thus far given that the heating oil is circulated through out the various chambers and grills by pump 144 in the manner indicated by the arrows. Thus oil is drawn from container 114 through pipe 145 and is then pressurized by pump 144 and forced thereby through pipe 143 to space 136. It leaves space 136 through inner passage 131 and enters container 105 from which it is led by flexible hose 112 to the upper grills 100 and by pipes 103 to lower grills 84. It is then forced from upper grill 100 through flexible hose 113 and from lower grill 84 through pipes 104 to container 106 from which it then flows through the annular passage 132 and openings 139 into annular space 140 and then back into container 114 through vertical passage 141 and pipe 142. Because of the flexible nature of the hoses 112 and 113, the circulation of the oil is not interrupted or materially altered by the position of upper grill 100 relative to lower grill 84 and hence said upper grill 100 will continue to be heated even when it is in the raised position shown to the left in FIG. 5.

Provision is made for draining container 114 through a drain plug 146. Any oil which may escape from between the interior of bearing 127 and the exterior of outer tube 129 is collected in an inner peripheral groove 147 and is then led back to groove 140 by axially disposed passages 148.

Extending radially outwardly from each upper grill 100 is a rod 148 at the end of which is disposed a roller 149. Under normal operating conditions, upper grill 100 will rest upon the meat disposed on the upper surface of the lower grill 84 so that the entire weight of the upper grill, including the weight of the hot oil, is impressed upon the meat to cook and shape the meat evenly. It is contemplated that outer tube 129 will be rotated by a sprocket 150 secured thereto between bearing 127 and container 106, and connected by a chain 151 to a drive sprocket 152 (FIG. 1) driven from a motor 153 through a suitable speed reducing mechanism 154. Accordingly rollers 149 are arranged to contact and ride on a rail 155 shaped as indicated in FIGS. 1 and 2 to raise upper grill 100 off of the cooked meat to substantially the position shown in FIG. 5. Said rail 155 is fastened in any appropriate manner to a post 156 and at two intermediate points to posts 157 and 158. Said latter two posts also support switches 159 (on post 158) and 160 and 161 (on post 157). Said switches may be of the microswitch variety so as to be sensitive to relatively small movements of their operating arms. It is contemplated that said operating arms will be disposed in the path of movement of rollers 149 so that as said rollers ride over the rail to the portion thereof over which a switch is located, said arm will be contacted by roller 149 and will be moved away from the rail. This movement of the switch arm is utilized to make or break contacts disposed within the switch as the case may be. To make certain that a raised grill will be lowered at the proper time, an upper guide rail 155a is provided, the roller 149 being adapted to ride under rail 155a and to be forced downward along lower rail 155.

The function of the switches and of the remaining controls will now be described with reference to the schematic wiring diagram shown in FIG. 7–B. In that figure electrical energy for motivating and controlling the hereinabove described machine is derived from a main line including two leads 162 and 163. Said line is connected by a master switch 164 to leads 165 and 166 within the machine and to which all of the electrically operated or controlled mechanisms within the machine are connected. Motor 153, which drives the revolving grills and also pump 144, is connected across leads 165 and 166 by leads 171, 172. An automatic stopping device, including a switch 167, is connected in lead 171 in series with motor 153, the device being so arranged as to stop the operation of the moving parts of the machine, including motor 153, when a predetermined number of cooking process, a ring is provided around the patty, the ring being carried by upper grill 100. Said ring is shown more clearly in FIGS. 2–A and 2–B and is comprised of a sheet metal cylindrical section 201 having diametrically opposed, radially extending ears 202 (only one being shown in these figures for convenience) secured to the upper edge thereof as viewed in FIG. 2–A, each ear having a keyhole slot 203 formed therein through which may extend a shouldered pin 204 depending from an ear 205 secured to and extending laterally from the sides of upper grill 100. The upper surface 83 of lower grill 84 extends radially outwardly beyond the cooking surface of upper grill 100 so that ring 201 may encircle the edge of upper grill 100 and rest upon surface 83. Pin 204 is of sufficient length to enable ring 201 to ride on or contact surface 83 without interference with the head thereof. The keyhole slot arrangement permits ring 201 to be removed readily from the upper grill 100 when it is desired to clean both the grill and the ring.

Any grease or fluids escaping from sealing ring 201 are caught in a drip pan 206 which rests upon the insulated top of container 114. The drip pan is shown in FIGS. 1, 5, 5–A and 5–C and is comprised of two semi-annular sections 207 and 208, preferably made of corrosion resistant sheet metal and having continuous upstanding peripheral side walls 209 and 210, respectively. The upper edge or lip of each side wall is folded over as at 211 for greater strength and rigidity, and the two semi-annular sections are joined together at their abutting radially disposed walls 212 and 213 by spreading the folded-over lip of one of the sections, for example section 209, so that it forms a hook 214 which embraces the upper edge of the radially extending wall 213 of the other section. This construction not only holds the two sections firmly together, but it also seals the space between the radially extending walls 212 and 213 so that any grease or liquid dripping over this region will fall into one or the other of the sections and not into the space therebetween. The two-part annular construction of the drip pan makes it possible for the pan to be removed and thoroughly cleaned without disassembling the entire grill section of the device.

The drip pan also serves as a partial support for the chute as shown in FIG. 6–A. It may be observed in that figure that bottom wall 195 of the chute rests upon the upper edge of section 206 and that the left-hand region of the chute as viewed in FIG. 6–A is provided with a hook 215 which engages a rod 216 suitably supported from the frame of the machine between the drip pan and the bottom of the lower grill 84.

The means for presetting the machine for producing a predetermined number of cooked hamburger patties and then stopping automatically is shown in FIGS. 7 and 7–A. It is comprised of the relay 168, previously alluded to in connection with FIG. 7–B, which is connected to a lever 216 pivoted at 217 to some stationary part of the mechanism and urged continuously against a stop 218 by a tension spring 219. On the end of lever 216 opposite the end connected to solenoid 168 is mounted a pawl 220 biased in a clockwise direction as viewed in FIG. 7 by a spring 221. Said pawl 220 engages a ratchet wheel 222 which is prevented from rotating in a counter-clockwise direction as viewed in FIG. 7 by a detent 223.

Ratchet wheel 222 is pinned or otherwise secured to a shaft 224 rotatably mounted in a wall 225 readily accessible to the operator of the machine. Said wall 225 may be a part of the machine, or it may be disposed at a point remote from the machine as desired. An index in the form of a small rectangular plate 226 having a window or opening 227 is affixed to wall 225 in any suitable manner as by a pin or bar 228 extending outwardly, that is, to the right as viewed in FIG. 7–A from wall 225. Between plate 226 and wall 228 is mounted a dial 229 in the form of a disc having a knob 230 on its outer side and a cylindrical hub 231 on the opposite side thereof.

Said hub 231 has an opening 232 in its central region by which it may be mounted on shaft 224 for free rotation therearound. Knob 230, dial 229 and hub 231 are appropriately fastened together by a plurality of screws 233.

The central region of dial 229 has an opening formed therein, the edges of which are provided with internally disposed teeth adapted to engage external teeth 234 formed in the enlarged end of shaft 224. Knob 230 has a recess 235 of greater diameter than the diameter of the enlarged end of shaft 224 and greater depth than the axial width of the enlarged toothed end of shaft 24, such that when knob 230 is pushed to the left as viewed in FIG. 7–A, teeth 234 will be disengaged from the teeth on the interior of dial 229 and will enter the said recess 235. Thus dial 229 may be disengaged from shaft 224 and rotated freely with respect to said shaft 224 as long as knob 230 is pushed to the left to disengage teeth 234 from dial 229. A spring 236, however, disposed between ratchet wheel 222 and hub 231, continuously urges said hub 231 and its associated dial 229 and knob 230 to the right to engage the teeth of the dial with teeth 234. The left hand ends of teeth 234 as viewed in FIG. 7–A are rounded so that engagement between the two sets of teeth may be readily effected without requiring careful indexing of the two sets of teeth.

Hub 231 has a cam-like projection 237 formed on the outer periphery thereof which is adapted to contact and move the operative portion 238 of switch 167. Said operative portion and switch are so arranged that when cam 237 is directly over said portion 238, the switch is conditioned to open the circuit therethrough. It may be recalled from FIG. 7–B that the opening of switch 167 stops motors 47 and 153 as well as deenergizes all of the electrical equipment associated with the machine with the exception of the heater units 118 and 119. In view of the length of time required to bring the oil and grills up to cooking temperature, it has been found desirable to maintain the heater units 118 and 119 in operation despite the fact that the balance of the machine may not be operating so that when an order for hamburgers is received, the machine is instantly in readiness to fulfill such order.

The front face of dial 229 as viewed in FIG. 7 has consecutive numbers 239 applied thereto, one for each tooth of ratchet wheel 222. Thus each time the ratchet wheel 222 is turned, dial 229 will be rotated the angular distance between two numbers. The numbers preferably arranged on dial 229 at a radial distance thereof which is such that the numbers will be readily visible through index opening 227, and each movement of wheel 222 from one tooth to the next will thus bring to view the adjacent number on the dial.

To set the machine to stop automatically after any predetermined number of meat patties or hamburgers are cooked, knob 230 is pushed inwardly until teeth 234 are free of the teeth on dial 233, and the knob is then turned until the desired number appears in the opening 227, whereupon the knob is allowed to return to the right as viewed in FIG. 7–A under the action of spring 236 until the teeth 234 are again in engagement with the internal teeth on dial 233. Thereafter, the normal operation of the machine is such that relay 168 will be operated momentarily each time a roller 149 passes over switch 159. Each time relay 168 is operated, lever 216 is oscillated about its pivot 217 and pawl 220 will move ratchet 222 clockwise as viewed in FIG. 7 a distance equal to one tooth. Simultaneously with the appearance of the number zero in opening 227, cam 237 will operate switch 167 to open the circuit to motors 153 and 47, and will deenergize the entire machine with the exception of the heat units as aforementioned. At any stage, the operator may read from the dial the number of hamburgers in the order still remaining to be cooked.

Thus it may be apparent that the machine as described above can be preset to produce automatically any numhamburgers or meat patties has been cooked. This device will be described more in detail hereinafter. Suffice it to say that said device is operated by a relay 168 which is energized periodically by switch 159 controlling the operation of the transfer ring 75. The operation of switch 167 to open the circuit to motor 153, however, does not affect the operation of the heating units 118 and 119, these being operated either by their individual switches 169 and 170, respectively, or by master switch 164.

One side of motor 47, which it may be recalled operates piston 16, is connected through leads 173 and 174 to lead 172 through the series switch 52 previously described. The other side of motor 47 is connected by a lead 175 to switch 160, the other side of said switch 160 being connected through a lead 176 to lead 171. Thus, under normal operating conditions, motor 47 is energized whenever switch 160 is closed. Relay 66, which controls the operation knives 59 and 60, is connected on one side to lead 176 and on the other side through lead 177 to switch 161, the other side of said switch being connected through leads 178, 179 to lead 172. Thus knives 59, 60 are operated to separated or open position whenever switch 161 is closed. It is contemplated, therefore, that switch 161 will be normally closed and will be opened upon contact with a roller 149 as it passes the switch.

Solenoids 93 and 94, which control the operation of the transfer mechanism including ring 75, are energized by single pole double throw switch 159. The pole of the switch is connected to lead 179, one side of the switch is connected through lead 180 to relay 94 and thence through a lead 181 to lead 176, and the other side of the switch is connected through a lead 182 to relay 93, the other side of which is connected through a lead 183 to lead 176. It is contemplated that relay 94 will be normally energized, that is, that switch 159 will be closed to connect lead 180 to lead 179 at all times except when a roller 149 passes switch 159, whereupon contact with the operating member thereof will break the circuit through relay 94 and will establish the circuit through relay 93, thereby rotating ring 75 toward a grill 84 to deposite thereon a meat patty or hamburger. Upon passage of a roller 149 past switch 159, the latter will be restored by suitable resilient means (not shown) to its initial condition wherein the circuit to relay 93 is broken and that to relay 94 is completed. The latter situation results in a return of ring 75 to the vertical position shown in dotted lines in FIG. 3.

The sequence of operations performed upon the various switches, etc. by the movement of a typical pair of grills through 360° is shown in FIG. 6. The stations corresponding to zero and 360° are, of course, the same and constitute the beginning of one cycle and the termination of the preceding cycle. For convenience, five different stations are shown which may be considered as five consecutive stations of a single pair of grills 84 and 100, and inasmuch as there are but five pairs of grills in the machine chosen to illustrate this invention, each station also indicates the relative position and condition of each of the five pairs of grills when one of them occupies a position corresponding to one of the positions shown in FIG. 6.

Referring now to FIG. 6 and commencing with the right hand station marked 0°, upper grill 100 at that instant is resting upon a meat patty which in turn is supported upon a lower grill 84, the meat patty being thereby heated and having been continuously heated since its initial contact with the grills 84 and 100. Upon passage of the grills 84 and 100 through a distance of 72° and then approximately 15° beyond, roller 149 will contact rail 155, and further movement of grill 100 in its arcuate path will cause roller 149 to ride up on rail 155 to the position labeled 144° in FIG. 6. In passing to this position, roller 149 will first contact the operating arm 184 of switch 161 to close the switch and energize relay 66. This, as described above, causes knives 59 and 60 to swing away from one another so that the way is clear for meat to be extruded through tube 56 into ring 75. Approximately 10° beyond, that is, at substantially the position shown at 144°, switch 160 will be closed to energize motor 47 and urge piston 16 into container 10 through the previously described mechanism shown in FIG. 1–A. It is understood that motor 47 is operated only as long as roller 149 is in contact with the operative portion of switch 160, and that just as soon as the switch is passed, the circuit through motor 47 will be broken and the motor will, of course, stop.

Movement of the grills 84 and 100 to the positions corresponding to 216° causes roller 149 to contact the operative portion of switch 159 to deenergize relay 94 and energize relay 93, thereby lowering ring 75 to proximity with the surface of lower grill 84, further movement of the grills then deenergizing relay 93 and reenergizing relay 94 to bring ring 75 back to its vertical position. Said ring 75 will be given a slight impact or jar when flanged ring 96 strikes washer 97, as described above. With the raw meat patty or hamburger placed upon lower grill 84, it will immediately commence to be cooked, and when the upper grill 100 reaches the position shown at 288° it will have been lowered by contact with upper rail 155a until it rests upon the upper surface of the raw meat and commences to apply pressure thereto as well as heat. The two grills 84 and 100 will then continue their arcuate travel while cooking the meat enclosed therebetween until the 360° or zero position is again reached.

While the upper grill 100 is raised in the 144° position, means are provided for removing the cooked meat so that lower grill 84 will be empty and ready to receive a raw meat patty or hamburger in the 216° position. The means for removing the cooked meat is shown in FIGS. 6–A and 6–B and comprises an arm 185 which may be fixed to post 157 and which extends over the path travelled by a lower grill 84. A scraper 186 is secured to arm 185 and is arranged with its bottom edge 187 just barely touching, or a very short distance above, the surface 83 of lower grill 84. Scraper 186 is secured to arm 185 by flanged pins 190 and 191 secured to the side of arm 185 and extending through a pair of keyhole slots 188, 189 in the scraper. The keyhole slot arrangement is utilized to permit scraper 186 to be readily removed from arm 185 for cleaning purposes.

Below and slightly to the right (FIG. 6–A) of arm 185 is a chute 192 having an inclined wall 193 immediately below the position occupied by the meat patty when the latter is in contact with the scraper 186 and is being held by said scraper while the lower grill 84 is moving laterally under it. Said inclined wall 193 terminates in a vertical wall 194, the latter in turn terminating in a horizontal or bottom wall 195 and in a depending flange 196. Upon bottom wall 195 is placed a container 197 shaped to fit within chute 192 and having a perforated upper surface 198 and a handle or drawer pull 199. Suitably shaped vertical sides 200 provide rigidity for the chute and also serve to guide a cooked patty in its movement down the chute. It is contemplated that the patty will slide down surface 193 and then upon the perforated surface 198, any excess grease or liquid on the patty finding its way through the perforated upper surface 198 into the container 197.

The container 197 may be left in the position shown in FIG. 6–A until all of the patties in a given batch are cooked and have fallen thereon, or the container with one or more patties thereon may be removed from the chute by sliding the container to the right as shown in FIG. 6–A, the handle 199 being conveniently used for this purpose.

To seal the space between the upper and lower grills 184 and also to help confine liquids liberated by the ber of cooked meat patties or hamburgers within the limits of dial 229 and its associated ratchet wheel 222 without requiring the attention of an operator. When the predetermined number has been completely cooked, the machine will automatically stop and all of the cooked hamburgers will be stacked in chute 192. While so stacked, any excess fluids such as grease, juices or the like will drain off into a grease drawer which may subsequently be emptied. All of the hamburgers formed by the machine will be uniform both as to size and degree of cooking, and the latter will be particularly uniform inasmuch as a hot liquid is used which thoroughly and uniformly heats all parts of the grills. All parts of the machine coming in contact with the food can be readily cleaned and are so formed as to be removable or else are made without any pockets or recesses in which food particles may accumulate and from which such particles cannot be dislodged without difficulty.

It may be mentioned that for convenience in controlling piston 16 manually, a hand operated switch 240 is provided in series with motor 47 by which said motor may be operated independently of switch 160 when it is desired to start piston 16 into a refilled container 10.

If it is desired still further to safeguard the sanitation of the machine, the latter may be suitably encased in a cover 241 (FIGS. 1, 2 and 5) certain portions of which, such for example as 242, 243 and 244, may be hinged to provide ready access to the parts within. An appropriate opening may be left in the cover for the reception of the chute 192, and the cover may be made of stainless steel or other non-corrodible material.

It is understood that the foregoing description is merely descriptive of a preferred embodiment of the invention and that the scope of the invention therefore is not to be limited thereto but is to be determined by the appended claims.

I claim:

1. In an apparatus for cooking consecutively meat patties or the like, a plurality of heated grills, means mounting said grills for movement about a vertical axis, electromagnetically operated means for supplying each grill with a meat patty, electromagnetically operated means for moving said grills about said vertical axis, and means for arresting the movement of said grills after a predetermined number of patties have been cooked, said last named means comprising a ratchet wheel, a pawl adapted to engage said wheel, solenoid operated means for turning said pawl over said ratchet a predetermined angular distance for each operation of the solenoid therefor, means for operating the turning means solenoid in timed relation with the movement of the grills, a dial, a cam rotatable with the dial, switch means, said switch means being operated by the cam, means for rotating the cam with the ratchet, and means for altering the angular relationship between the cam and ratchet.

2. The combination described in claim 1, the means for rotating the cam with the ratchet comprising a shaft for the ratchet and extending axially therefrom, a toothed wheel mounted on the extending end of the shaft for rotation therewith, said cam being mounted on the extending end of the shaft between the ratchet and toothed wheel and freely rotatable thereon, and said dial having internal teeth adapted to engage the toothed wheel on the shaft, whereby the angular relationship between the cam and ratchet may be altered by sliding the cam and dial axially until the teeth of the dial are free of the tooth wheel, then rotating the dial and cam relative to the toothed wheel the desired angular distance, and then sliding the cam and dial back until the teeth of the dial reengage the toothed wheel.

3. In an apparatus for cooking food in a plastic state, spaced upper and lower grills, each including a substantially flat food-contacting surface, the food-contacting surface of the lower grill having portions thereof extending laterally beyond the food-contacting surface of the upper grill, means enclosing the space between said food-contacting surfaces while the food is being cooked and adapted to be supported by the laterally extending portions of the lower grill food-contacting surface, and means mounting the enclosing means for reciprocation relative to the upper grill food-contacting surface, said mounting means comprising apertured ears extending laterally from the enclosing means, and headed pins secured to the upper grill and extending through said apertures, the heads of the pins being adapted to engage the said ears to cause the enclosing means to move with the upper grill.

4. In an apparatus for cooking food in a plastic state, spaced upper and lower grills, each including a substantially flat food-contacting surface, the food-contacting surface of the lower grill having portions thereof extending laterally beyond the food-contacting surface of the upper grill, means enclosing the space between said food-contacting surfaces while the food is being cooked and adapted to be supported by the laterally extending portions of the lower grill food-contacting surface, and means mounting the enclosing means for reciprocation relative to the upper grill food-contacting surface, said mounting means comprising ears extending laterally from the enclosing means and having keyhole slots therein, and headed pins secured to the upper grill, the heads of the pins being adapted to pass through the keyhole slots such that when the enclosing means is moved in the plane of the food-contacting surface of the upper grill after the pins are inserted in said slots, the pins will lock the enclosing means to the upper grill.

References Cited in the file of this patent

UNITED STATES PATENTS

| | | |
|---|---|---|
| 1,117,929 | Turnbull et al. | Nov. 17, 1914 |
| 1,127,899 | Koppitz et al. | Feb. 9, 1915 |
| 1,507,883 | Campbell | Sept. 9, 1924 |
| 1,617,026 | Neylon | Feb. 8, 1927 |
| 1,706,612 | Jaeger | Mar. 26, 1929 |
| 1,881,126 | Parr | Oct. 4, 1932 |
| 2,048,011 | Leaf et al. | July 21, 1936 |
| 2,176,855 | Gough | Oct. 17, 1939 |
| 2,211,261 | Enos | Aug. 13, 1940 |
| 2,349,583 | Tatosian | May 23, 1944 |
| 2,358,452 | Garstang | Sept. 19, 1944 |
| 2,500,973 | Ackerman | Mar. 21, 1950 |
| 2,563,253 | Levin | Aug. 7, 1951 |
| 2,583,887 | Schneeweiss | Jan. 29, 1952 |
| 2,706,830 | Holly | Apr. 26, 1955 |
| 2,715,372 | Whitsel | Aug. 16, 1955 |